(12) United States Patent
Morimoto et al.

(10) Patent No.: US 7,995,032 B2
(45) Date of Patent: Aug. 9, 2011

(54) PROGRAM FOR GAME APPARATUS, GAME APPARATUS, AND RECORDING MEDIUM STORING PROGRAM FOR GAME APPARATUS

(75) Inventors: Kenjiro Morimoto, Tokyo (JP); Takashi Yuda, Tokyo (JP)

(73) Assignee: Sega Corporation

( * ) Notice: Subject to any disclaimer, the term of this patent is extended or adjusted under 35 U.S.C. 154(b) by 696 days.

(21) Appl. No.: 12/044,669

(22) Filed: Mar. 7, 2008

(65) Prior Publication Data

US 2008/0303790 A1  Dec. 11, 2008

Related U.S. Application Data

(63) Continuation of application No. PCT/JP2006/317861, filed on Sep. 8, 2006.

(30) Foreign Application Priority Data

Sep. 8, 2005 (JP) ................................ 2005-261359

(51) Int. Cl.
  *G09G 5/08* (2006.01)
(52) U.S. Cl. ........................... 345/157; 345/473; 463/32
(58) Field of Classification Search .................... 463/31, 463/32, 36, 37, 39; 345/158, 419, 473; 715/706, 715/861
See application file for complete search history.

(56) References Cited

U.S. PATENT DOCUMENTS

| 6,200,138 B1 * | 3/2001 | Ando et al. ..................... 434/61 |
| 6,471,586 B1 * | 10/2002 | Aiki et al. .......................... 463/6 |
| 6,524,186 B2 * | 2/2003 | Takatsuka et al. .............. 463/37 |
| 2004/0259615 A1 | 12/2004 | Mori et al. |

FOREIGN PATENT DOCUMENTS

| JP | 10-513593 A | 12/1998 |
| JP | 2002-085839 A | 3/2002 |
| JP | 2003-216974 A | 7/2003 |
| JP | 2004 313252 A | 11/2004 |
| JP | 2004-334850 A | 11/2004 |

* cited by examiner

*Primary Examiner* — Abbas Abdulselam
(74) *Attorney, Agent, or Firm* — Dickstein Shapiro LLP (57) ABSTRACT

An object is to provide a program for a game apparatus for making a plurality of moving objects including a moving object operated by a player to compete in virtual space against each other, in which players are capable of fully using the stage effects specific to a virtual game to enjoy a heated racing game even when they vary in skill. In a program for a game apparatus comprising moving-object operating means, image-information generating means, and image-information outputting means, the program causes a computer to perform a step of producing land-configuration information, a step of monitoring movement information regarding a plurality of moving objects, a step of producing a special area object when results of monitoring meet predetermined requirements, a step of displaying the special area object in such a manner as to be viewable for the player, and a step of allowing another moving object to ride therein.

12 Claims, 11 Drawing Sheets

PROGRAM FOR GAME APPARATUS, GAME APPARATUS, AND RECORDING MEDIUM STORING PROGRAM FOR GAME APPARATUS

CROSS-REFERENCE TO RELATED APPLICATION

This application is a continuation application of and claims the benefit of International Application Number PCT/20066/317861, filed Sep. 8, 2006. The disclosure of the prior application is hereby incorporated herein in its entirety by reference.

BACKGROUND OF THE INVENTION

1. Field of the Invention

This invention relates to a program for a game apparatus, a game apparatus and a machine-readable recording medium storing the program, for races between a plurality of moving objects including a moving object operated by a player in a virtual space.

2. Description of the Related Art

In recent days, game apparatuses capable of producing various kinds of image have become available as the computer image processing technique progresses. These game apparatuses, which are for racing games, fighting games, simulation games, shooting game and the like, respectively utilize realistic images and sound to enhance enjoyment of players.

For example, a car racing game or the like is proposed, in which a vehicle operated by a player and a vehicle operationally controlled by a computer, or alternatively vehicles respectively operated by a plurality of players compete against each other on a racecourse created in a virtual space over the travel distance within the time limit or over the time required to cover a given number of laps. Further proposed is another game apparatus which takes into account the slip stream effect which is taken advantage of in a real car race or employs image processing to create an image realistically showing exhaust gas in order to further increase the sense of reality (see Japanese Patent unexamined publication No. 2001-276435).

The most enjoyable element in such a race gaming apparatus is the progress of a heated race with offense and defense between a moving object (e.g. car) operated by a player and a moving object operated by a computer or another player chasing each other back and forth on the racecourse. However, when strong emphasis is laid on pursuing reality, there is a problem that the advantage of amusing the players with fantastic stage effects using unrealistic special actions or contrivances only possible in a virtual game is weakened.

Also, the more realistic the progress of the game is made, the higher becomes the degree to which the results of the game depend on the skill of the players. This gives rise to the problem of the difference in skill among the players possibly spoiling the enjoyment of both a beginner and a skilled player because the game would be terminated before the moving object operated by the beginner gets closer to another moving object going ahead of that of the beginner or the game would be terminated with the moving object operated by the skilled player traveling alone in the first place.

SUMMARY OF THE INVENTION

The present invention has been made to solve the aforementioned problems and an object thereof is to provide a program for a game apparatus, a game apparatus and a recording medium storing the program for the game apparatus, which are capable of fully using the stage effects specific to a virtual game to give the enjoyment of the progress of a heated race to all players even when they vary in skill.

In order to solve such problems, the first aspect of the present invention provides a program for a game apparatus comprising moving-object operating means through which a player operates a moving object, image-information generating means for generating image information on images showing a plurality of moving objects including the moving object operated by the player in a virtual space, and image-information outputting means for outputting the image information generated by the image-information generating means, in which the program is characterized by causing a computer in the image-information generating means to perform: a step of causing land-configuration information generating means of the image-information generating means to generate land-configuration information regarding the virtual space; a step of causing movement-information monitoring means of the image-information generating means to monitor movement information regarding the plurality of moving objects at predetermined time-intervals; a step of causing special-area object producing means of the image-information generating means to delimit a special area behind the moving object to produce a special area object having collision detection information when results of monitoring through the movement-information monitoring means meet predetermined requirements; a step of causing the image-information outputting means to display the special area object in such a manner as to be viewable for the player; and a step of allowing another moving object to ride in the special area produced by the moving object meeting the predetermined requirements in a manner of riding on waves.

The second aspect of the present invention is characterized by causing the computer to perform a step of allowing the moving object producing the special area object by the special-area object producing means to change its movement state to change a shape of the special area object.

The third aspect of the present invention is characterized by causing the computer to perform a step of shaping the special area object into a three-dimensional form.

The fourth aspect of the present invention is characterized by causing the computer to perform a step of allowing the another moving object riding in the special area produced by the moving object meeting the predetermined requirements to perform trick riding through using collision detection information with the special area object.

The fifth aspect of the present invention is characterized by causing the computer to perform a step of allowing the another moving object riding in the special area produced by the moving object meeting the predetermined requirements to take a shortcut on a prearranged traveling route for travel in the forward direction through performing the special action such as trick riding.

The sixth aspect of the present invention is characterized by causing the computer to perform a step of allowing the another moving object riding in the special area produced by the moving object meeting the predetermined requirements to enter a special route different from a prearranged traveling route for travel in the forward direction through performing the special action such as trick riding.

The seventh aspect of the present invention provides a game apparatus comprising moving-object operating means through which a player operates a moving object, image-information generating means for generating image information on images showing a plurality of moving objects including the moving object operated by the player in a virtual space, and image displaying means for displaying on a screen the image information generated by the image-information generating means, in which the game apparatus is characterized in that the image-information generating means comprises: land-configuration information generating means for generating land-configuration information regarding the virtual space; movement-information monitoring means for monitoring movement information of the plurality of moving objects at predetermined time-intervals; and special-area object producing means for delimiting a special area behind the moving object to produce an object having collision detection information when results of monitoring through the movement-information monitoring means meet predetermined requirements, wherein the special area object is displayed by the image displaying means in such a manner as to be viewable for the player, and another moving object can ride in the special area produced by the moving object meeting the predetermined requirements in a manner of riding on waves.

The game apparatus according to the seventh aspect comprises moving-object operating means, image-information generating means, and image displaying means, in which the image-information generating means includes land-configuration information generating means for generating land-configuration information regarding the virtual space, and the land-configuration information generating means generates land-configuration information from back-ground image information, land-configuration information of a course, and the like. Further, the image-information generating means includes movement-information monitoring means for monitoring movement information regarding the moving objects at predetermined time-intervals, and the movement-information monitoring means monitors and stores movement information about position, speed and the like of each of the plurality of moving objects at predetermined time-intervals. Still further, the image-information generating means includes special-area object producing means for comparing results of monitoring of the movement-information monitoring means with predetermined requirements, and for producing a special-area object behind the moving object meeting the requirements when these monitor results meet the predetermined requirements. The special area object produced by the special-area object producing means is an object having collision detection information for delimiting the special area which does not exist in the regular virtual space in which the above-described monitor results do not meet the predetermined requirements, and the special area object is displayed by the image displaying means in such a manner as to be viewable for the player. A moving object, which is not the moving object producing the special area object, is able to ride in the special area.

The eighth aspect of the present invention is characterized in that the moving object producing the special area object by the special-area object producing means is configured to change its movement state, so that a shape of the special area object can be changed.

The game apparatus according to the eighth aspect is designed such that the moving object producing the special area object changes its movement state such as the moving speed and/or the moving direction or a special operation is performed on the moving object, in order to make it possible to change the shape of the special area object.

The ninth aspect of the present invention is characterized in that the special area object is shaped into a three-dimensional form.

The game apparatus according to the ninth aspect is designed such that the special area object defines a special area of a three-dimensional form.

The game apparatus according to the tenth aspect of the present invention is characterized in that the another moving object riding in the special area produced by the moving object meeting the predetermined requirements is constituted to perform trick riding through using collision detection information with the special area object.

The game apparatus according to the tenth aspect is designed such that a moving object riding in the special area produced by another moving object fulfilling the predetermined requirements can use collision detection information with the special area object to perform special action such as jumping or a somersault which is different from that of the moving object gliding in the regular virtual space.

The eleventh aspect of the present invention is characterized in that the another moving object riding in the special area produced by the moving object meeting the predetermined requirements to take a shortcut on a prearranged traveling route for travel in the forward direction through performing the special action.

The game apparatus according to the eleventh aspect is designed such that a moving object riding in the special area produced by another moving object fulfilling the predetermined requirements performs the aforementioned special action, thereby being allowed to skip over a portion of the prearranged traveling route on which the moving object can glide in the regular virtual space so as to take a shortcut on the prearranged traveling route for travel in the forward direction.

The twelfth aspect of the present invention is characterized in that the another moving object riding in the special area produced by the moving object meeting the predetermined requirements is constituted to enter a special route different from a prearranged traveling route for travel in the forward direction through performing the special action.

The game apparatus according to the twelfth aspect is designed such that a moving object riding in the special area produced by another moving object fulfilling the predetermined requirements performs the aforementioned special action, thereby being allowed to enter a special route different from a prearranged traveling route into which the moving object cannot go forward when it glides in the regular virtual space.

The thirteenth aspect of the present invention is characterized in that the programs as described in the first to sixth aspects are stored in a machine-readable recording medium.

According to the present invention designed as described above, in a game in which a plurality of moving objects including a moving object operated by a player are operated in a virtual space, when the movement state of the moving object at a certain time point is judged to fulfill predetermined requirements as the results of monitoring by movement-state monitoring means, the moving objects produce special area objects delimiting special areas having collision detection information in the back of the moving objects. This makes it possible to give the enjoyment of the stage effects specific to a virtual game to a player operating a moving object behind the moving object producing a special area object who can select a traveling route (the aforementioned special area) suddenly occurring rather than a prearranged traveling route. In addition, because the special area object has information on collision detection, another moving object is allowed to enter and ride on the special area object.

According to an embodiment of the present invention, the moving object producing the special area object is capable of changing the shape of the special area object by changing its movement state such as a moving speed and a moving direction or with a special operation thereof, so that the moving object can obstructively behave such as disturbing the traveling position of another moving object behind riding on the special region object, forcing this moving object to take an unwished course, or throwing this moving object out of the special area.

According to another embodiment of the present invention, because the special area object can be shaped in an inner peripheral surface of, for example, a semi-cylindrical shape or a quarter-cylindrical shape, or other three-dimensional forms, the moving object riding on the special area can use the three-dimensional rounded surface thus is enabled to glide in a space in a higher level than the ground.

According to the other embodiment of the present invention, the moving object riding on the special area is designed to utilize collision detection with the special area object to perform a special action (tricky riding performance) such as turning all around itself in the air while jumping, for example. Because of this, it is possible to progress a racing game while performing a special action such as various types of tricky riding performance as in extreme sports.

In the present embodiment, by performing a special action, as described above, in the special area, the moving object can take a shortcut on the prearranged traveling route for travel in the forward direction because the landing point with respect to the jumping point is set to a point ahead of the point where the moving object reaches in the case that it travels without performing the special action during the same time period. As a result, as compared with the case that the special action is not performed, a rear moving object can go nearer to the front moving object for a short time period.

Further, in the present embodiment, a special route, which a moving object is incapable of entering when gliding in the regular virtual space but is allowed to enter by performing the special action in the special area, is set, so that the moving object can enter the special route for travel in the forward direction. As a result, the setting of giving, for example, the moving object entering the special route, privileges of turning the racing situation to advantage of the moving object, makes it possible to provide a virtual game including various elements for leading the game result to a high score other than normal traveling techniques such as a course choice for rounding a curve, deceleration timing, steering angle, steering timing and the like.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

A preferred embodiment of a game apparatus according to the present invention will be described below with reference to the drawings, taking a home-use game apparatus as an example. Note that FIG. 1 and FIG. 2 are respectively an outside configuration diagram and a block diagram of a home-use game apparatus.

Figure 1:
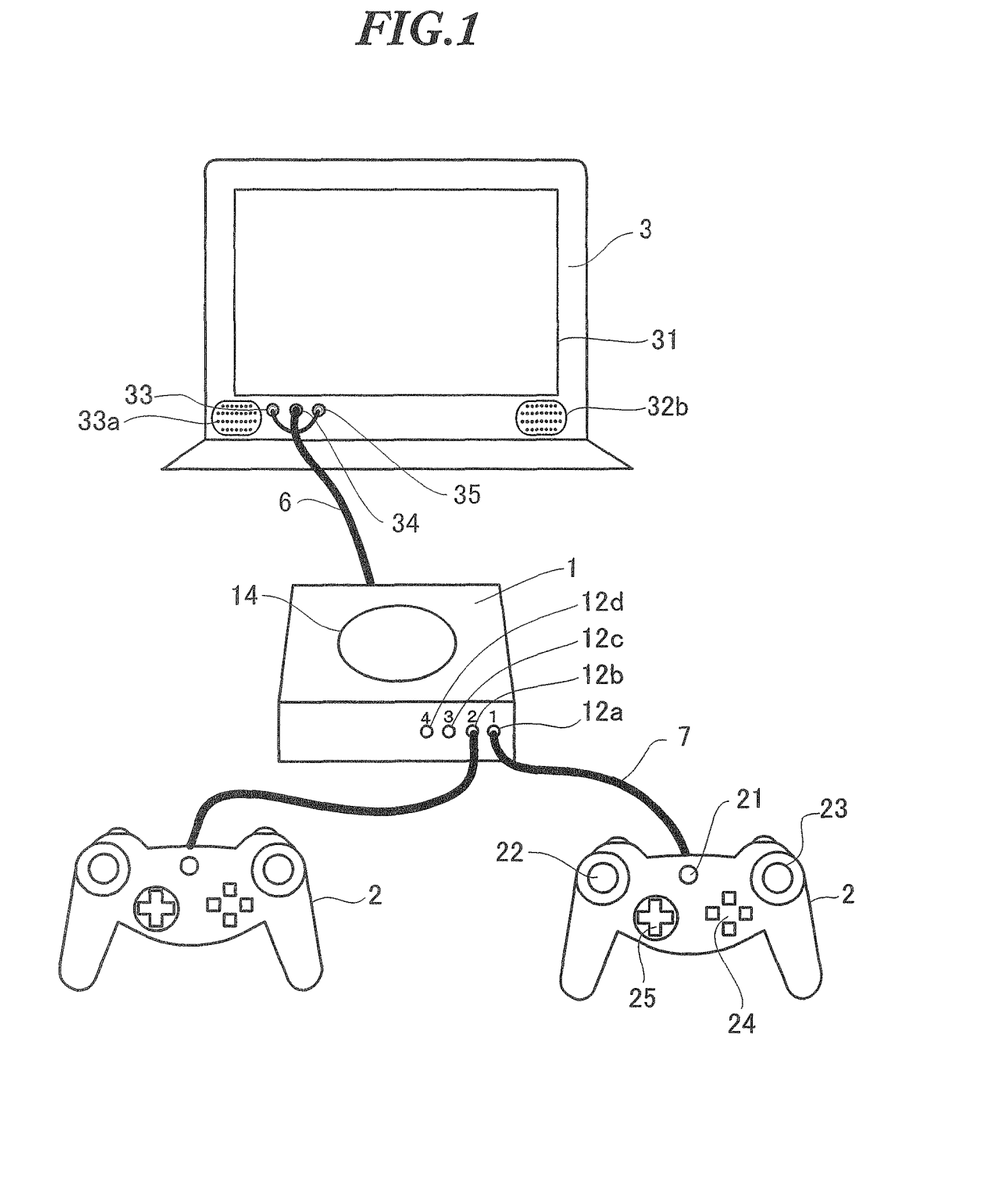
FIG. 1 is a configuration diagram of a game apparatus according to an embodiment of the present invention.

In FIG. 1, a game-apparatus body 1, which corresponds to image information generating means, is connected to an operation controller 2 or a plurality of operation controllers 2 through a connection cable 7, and to a television 3, which is image displaying means, through a image and sound connection cable 6 through which the output of the game-apparatus body 1 is applied to the television 3. The operation controller 2, which is moving-object operating means manipulated by a player, is provided with a start button 21 for entering the command for starting a game, right and left analog joysticks 22 and 23, various operating buttons 24, and a direction key 25, these input operating switches being assigned various functions in accordance with the game played. The game-apparatus body 1 of the present embodiment comprises input terminals 12a, 12b, 12c and 12d for receiving the outputs from four operation controllers, so that up to four players can simultaneously compete and enjoy the same game. Reference numeral 14 denotes a lid of a DVD-ROM reader incorporated in the game-apparatus body 1.

The television 3, which is the image displaying means, comprises a screen 31 displaying an image (picture), right and left speakers 32a and 32b outputting sound, and an image-signal input terminal 33, audio-signal input terminals 34 and 35 to which an image signal and audio signals are respectively supplied from the game-apparatus body 1.

Figure 2:
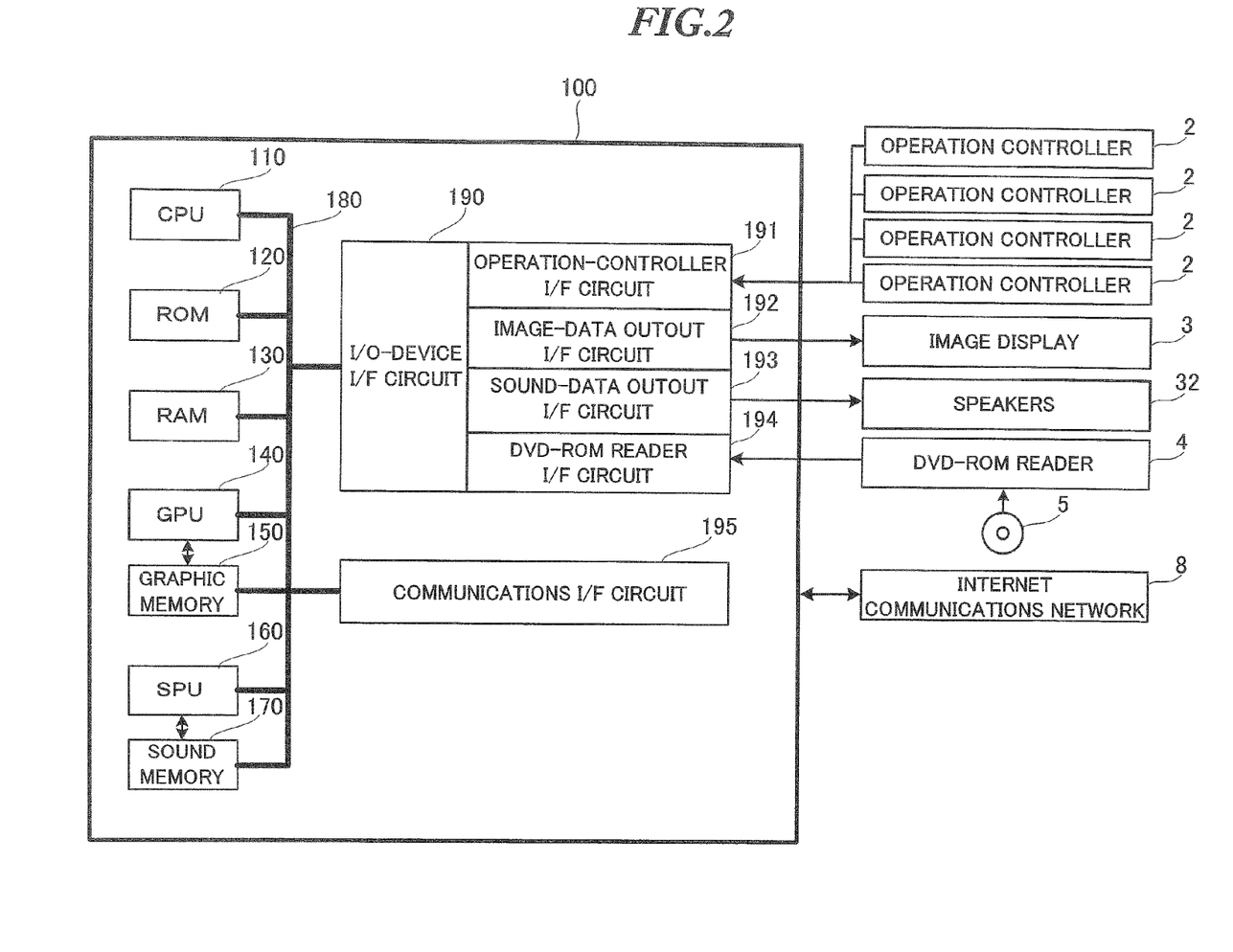
FIG. 2 is a block diagram of the game apparatus according to an embodiment of the present invention.

FIG. 2 is a block diagram of the home-use game apparatus in FIG. 1. A control board 100 incorporated in the game-apparatus body 1 is mounted with: a CPU 110 for overall control of the progress of a game; a read only memory ROM 120 in which programs and data required for the CPU 110 to perform various types of operation processing are stored; a writable and readable memory RAM 130 provided for temporarily storing information on movement of a moving object and information on land configuration of a virtual space obtained as the game progresses; a graphic processor unit GPU 140 for generating data on images to be displayed on the image display 3; a graphic memory 150 in which graphic data required for the GPU 140 to generate image data are stored; a sound processor SPU 160 for generating data on sound to be outputted from the speakers 32; and a sound memory 170 in which sound data required for the SPU 160 to generate sound data is stored, all which are connected to a bus 180.

The bus 180 is connected to an input/output-device I/F circuit 190. The input/output-device I/F circuit 190 comprises: an operation-controller I/F circuit 191 to which an operation command signal is supplied from the operation controller 2; an image-data output I/F circuit 192, which is image-information outputting means, for outputting the image data generated in the GPU 140 to the image display 3 on the basis of an image-data output command signal from the CPU 110; a sound-data output I/F circuit 193 for outputting the sound data generated in the SPU 160 to the speakers 32 on the basis of the sound-data output command signal from the CPU 110; and a DVD-ROM reader I/F circuit 194 that receives input about the data read by the DVD-ROM reader 4 incorporated in the game-apparatus body 1 such as a game program, image data and sound data relating to background and a course which are stored on a DVD-ROM 5. Also, the bus 180 is connected to a communications data I/F circuit 195 receiving and transmitting communications data from and to an internet communication network 8.

Next, the outline of a racing game played in accordance with the present embodiment will be described. In the racing game, characters ride on imaginary conveyances which are each called an "air board" using a force of air to form an air layer between the air board and the ground and gliding on the air layer like a snow board or a surfboard, and they race on a course (traveling route) established in a virtual space. Each of the characters makes a specified number of circuits around a predetermined course and the outcome of the race is decided by the order of reaching the finish line.

The air board is equipped with an air tank for accumulating air. While consuming (emitting) the air accumulated in the air tank, the air board carries out the actions of gliding, accelerating, jumping, sliding (in which the air board glides in a curved course, emitting air from a side of the air board) and the like. Air can be supplied by an act of reloading air at an air-supply point provided on the course, by obtaining an air-supply item, by successfully performing a special action called a "trick", by using a player's individual skill, or the like. The key for the player to achieve a high score is to know how to accelerate the player-operated character while giving consideration to the remaining amount of air and the location of the air supply point on the course.

Attributes of, for example, a speed type, a flying type, a power type and the like are allocated to characters. The characters fully perform the respective inherent skills during the race to be allowed to receive an air supply in accordance with their respective abilities.

The speed-type individual skill is one for gliding on a rail-shaped elongated special course (railway) without being affected by the gravitation (without falling over), enabling this character to take a shortcut on the original course and receive an air supply based on the distance over which the character glides on the railway.

The flying-type individual skill is one for gliding in the air bypassing over a kicker (jump platform) disposed in the course, enabling this character to take a shortcut on the original course and to receive an air supply to accelerate in the air by traveling through a dash ring disposed in the air.

The power-type individual skill is one for gliding while kicking predetermined obstacles disposed on the course away, enabling this character to pass through a special course with the obstacles through which the other characters with the other attributes cannot pass and to receive an air supply corresponding to the obstacles kicked away.

Since, before starting a race, each player can choose a character with a preferred attribute, this enhances the enjoyment of making extensive use of the strategy made possible by the characteristics of the selected character to progress the race.

Figure 3:
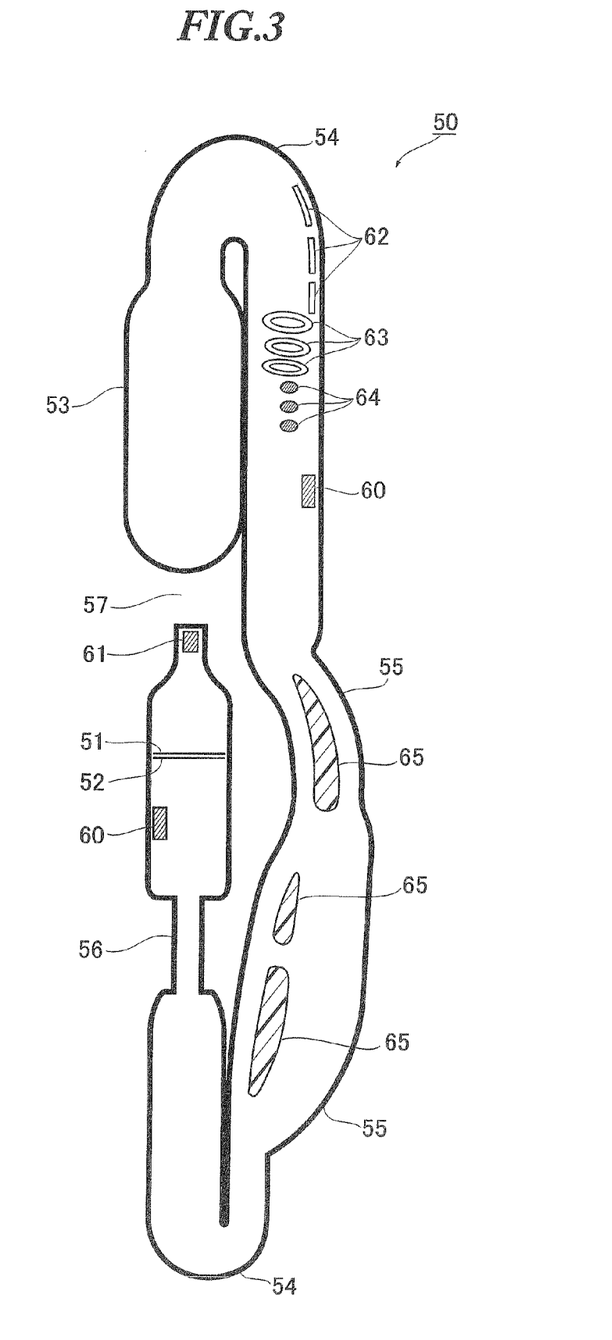
FIG. 3 is a plan view of a course for a racing game according to the embodiment of the present invention.

FIG. 3 is a plan view illustrating an example of a race course. In FIG. 3, a start point 51 and a finish point 52 are set in the course 50 around which the players glide a straight course 53, a sharp curve course 54, a gentle curve course 55, a course 56 in which the gliding method is restricted, a course 57 in which no ground is provided so as to require a special action such as jumping, and the like in the circumference. Incidentally, the start point 51 and the finish point 52 may be the same point. Also, disposed on the course are air supply points 60, a kicker 61 in which the player can put the trick into action, railways 62 in which the player can perform the individual skill to receive an air supply, dash rings 63, obstacles 64, no-entry areas 65, and the like. In addition, an acceleration item, an air supply item, other hidden items, a hidden passage appearing under predetermined conditions, which are not shown, are appropriately disposed.

All the characters joining in the race simultaneously start from the start point 51 and compete against each other for placing in the order of reaching the finish point 52 while gliding a specified number of circuits (e.g. three circuits) in the clockwise direction in FIG. 3.

A major feature in a racing game played in accordance with the present invention is to produce a special-area object when a character (moving object) meeting certain requirements while gliding creates a special-area behind itself. The special area is a virtual space area of which the walls are imagined to be made of an air current caused by the character gliding at high speed, which will be hereinafter referred to as "turbulence". The word "turbulence" is a word meaning "violent or unsteady movement of air current", but in this specification, is used as a technical term representing the aforementioned special area.

The turbulence is produced by a special-area object-producing means when the movement information obtained by monitoring the moving speed, action state and the like of the character meets predetermined requirements previously defined. For criteria for determining whether or not the character meets the predetermined requirements for generating turbulence, the land-configuration information, for example, can be used for determining whether or not any ground exists (the requirements are not met by a location as indicated by reference numeral 57 in FIG. 3) and whether the land configuration has permission information for the generation of turbulence as related to the air supply points 60, kicker 61, railways 62, obstacles 64 and the like, for example. For these criteria, the movement information can be used for determining whether or not the moving speed of the character is a predetermined speed (e.g. 180 km/h) or higher, and the player is performing a trick or an individual skill, for example.

The turbulence generated under such conditions is displayed on the screen 31 of the image display 3 in such a manner as to occur in the virtual space as an object delimiting a special space having collision detection information and for the player to recognize its occurrence.

The shape of the turbulence comprises an inner peripheral surface of an approximately half cylindrical shape (a half pipe shape) in the case that the character producing the turbulence glides straight ahead. Specifically, the shape corresponds to the inner rounded surface of half of a cylindrical pipe divided into two in the longitudinal direction, and has a semi-circular-arc cross section taken along a direction at a right angle to the gliding direction of the character, in which the approximately central portion of the arc is on the ground and arcs having approximately the same length are positioned to right and left. However, the shape of the turbulence is not limited to the above-described semi-circular arc shape, and may be a semi-elliptical arc shape, a parabolic shape or a brachistochrone (cycloidal curve) shape. In other words, the shape of surface extending from the ground portion to the end portions as substantially vertical surfaces is just required to be a smoothly continuous curved surface.

The shape of the turbulence can be set such that the width and the height of the right and left walls vary in accordance with the moving speed of the character producing the turbulence. For example, the higher the speed of the turbulence-producing character, the greater the degree of width and height to which the turbulence can be set.

The rear character gliding behind the turbulence-producing character can ride on the turbulence like a surfer on waves. Such riding and gliding over the turbulence is hereinafter referred to as "drafting".

Figure 4:
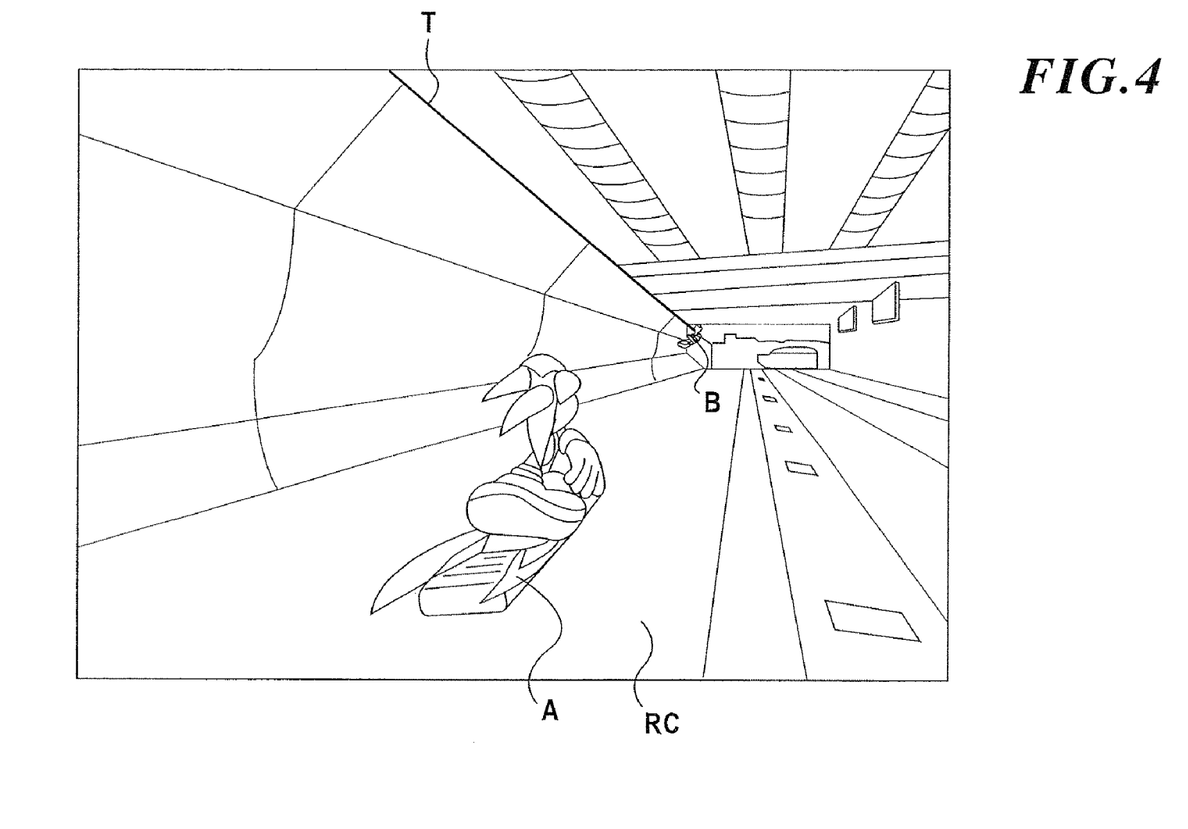
FIG. 4 is a picture for explaining a special area according to an embodiment of the present invention.

FIG. 4 is an image showing the scene where a character B gliding straight ahead in front of a character A operated by a player produces a half-pipe-shaped turbulence T. At this timing, the character A operated by the player is gliding over a regular course RC outside the turbulence T, which accordingly is not drafting.

Figure 5:
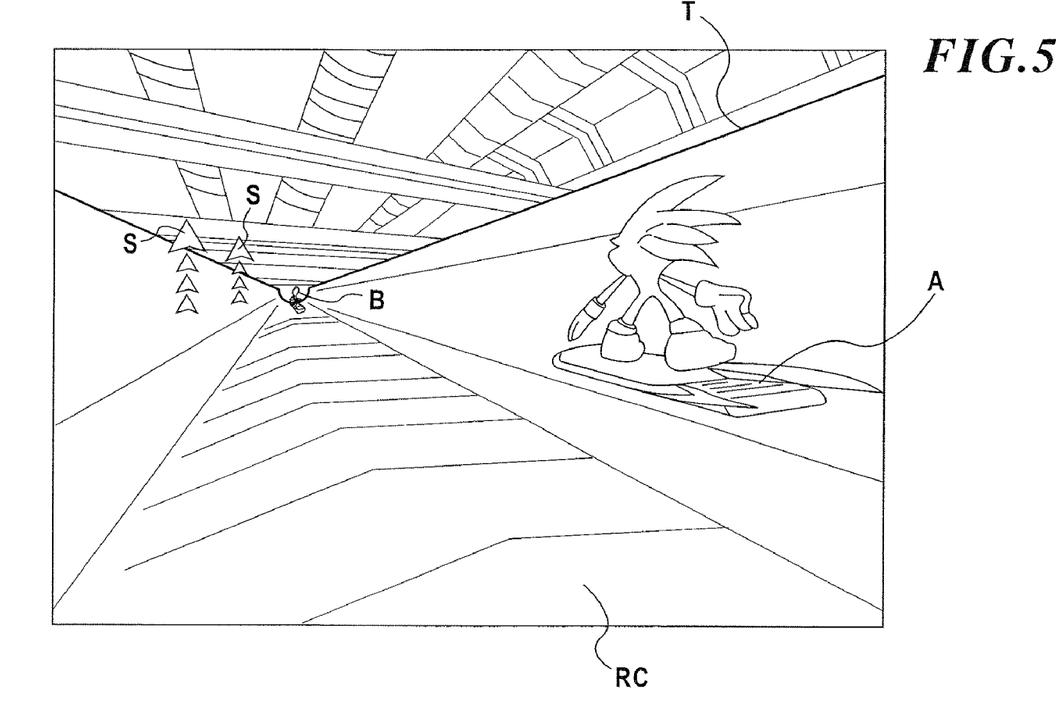
FIG. 5 is a picture for explaining the shape and effects of the special area according to the embodiment of the present invention.

FIG. 5 is an image showing the state of drafting of the rear character A operated by the player riding on the half-pipe-shaped turbulence T produced by the front character B. If the player manipulates the direction key 25 on the operation controller 2 (see FIG. 1), the character A drafting on the turbulence T can move to right or left over the turbulence T. An object S shown in an arrow form on the left wall of the turbulence T suggests the possibility that when the character A is steered to this position, the character A may be allowed to perform any special action (trick).

When the turbulence-producing character glides round a curve, the shape of the turbulence produced can be set to a shape having the inner wall in the curving direction (right wall if a right curve) having a height lower than the outer wall. If the moving speed is constant, the smaller the curvature radius of the traveling track in the curve, the greater the difference in height between the right and left walls can be set. In the same traveling track, the higher the traveling speed, the greater the degree of size (in width and height) to which the turbulence can be set, as in the case of the foregoing half-pipe-shaped turbulence. In addition, when the difference in height between the right and left walls reaches a maximum, the inner wall of the curve can be set so as to approximately become a grounding surface (zero height) such that the turbulence of an inner peripheral surface of a quarter-circular arc (a quarter pipe shape) occurs only on the outer side of the curve.

Figure 6:
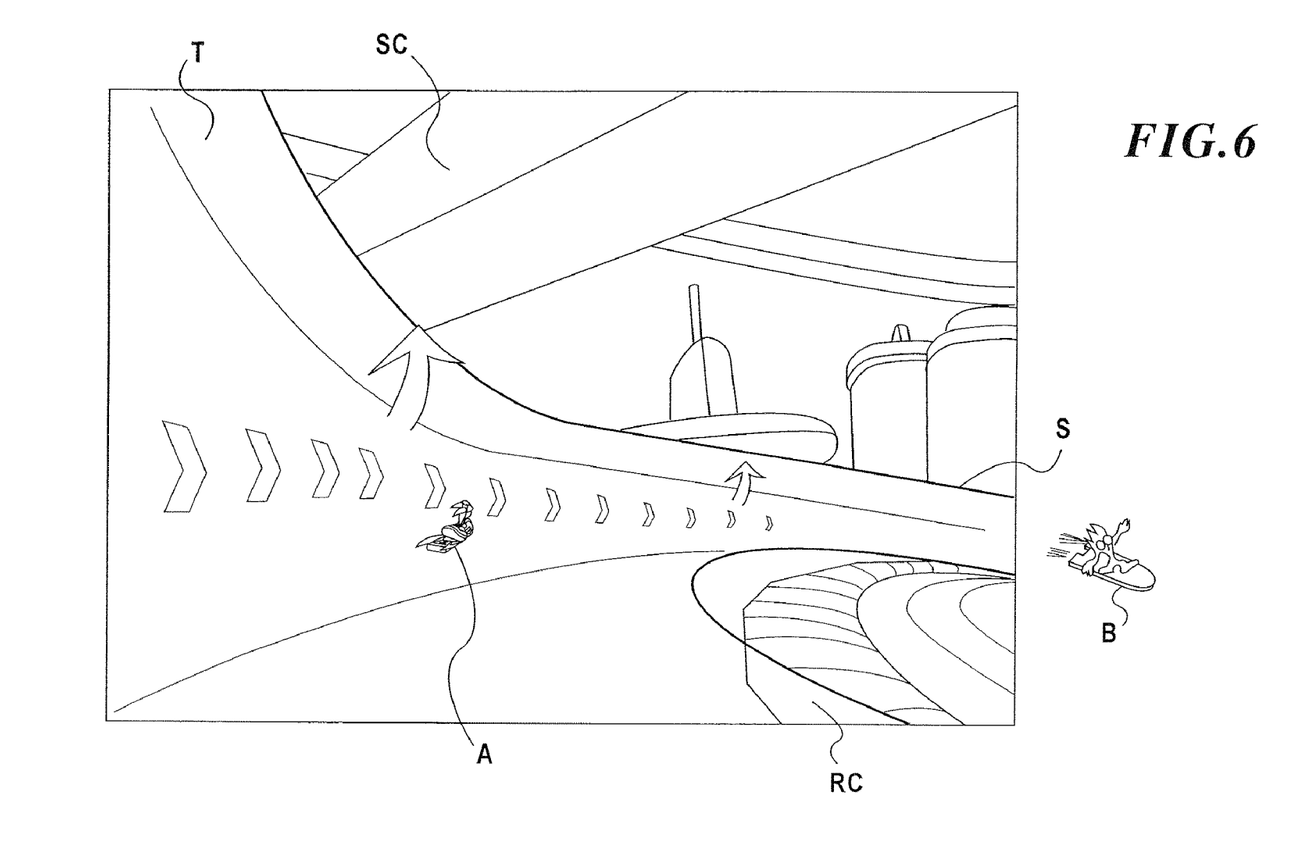
FIG. 6 is a picture for explaining another shape and other effects of the special area according to another embodiment of the present invention.

FIG. 6 is an image showing the state where the front character B (outside the screen) travels in a right curve course RC and produces a quarter-pipe-shaped turbulence T, and the rear character A is drafting on the turbulence T. The right side of this turbulence T (the inner side of the curve) is located with the same level as the regular course RC of the approximate grounding surface. On the other hand, the left wall of the turbulence T extends to a height longer than about ten times of the height of the character A (who is set to be about 1 m tall). At this stage, the character A is steered to an arrow-shaped object S suggesting that the character can perform a trick, and then the character A is allowed to use the trick zone appearing on the turbulence T to perform the trick. As a result, the character A is allowed to enter a special route SC built at a high level which the character cannot enter when gliding over the regular course RC.

In the present embodiment, the character B producing the turbulence T may be operated to change its moving direction or operated in a special manner to consciously vary the shape of turbulence T, in order to hinder the gliding of the character A during the drafting.

In the setting of the present embodiment, when the character A during the drafting on the turbulence T utilizes the trick zone, which is suggested by the arrow-shaped object S appearing above the turbulence T, to perform the trick, the character A can be refueled with the different amount of air in accordance with the difficulty level of the performed trick. The trick is a technique of rotating a character in the air, in which three levels of difficulty are set in view of the number of rotations (360 degrees×n turns) from when the character jumps to when it lands, the rotation direction and a combination of some kinds of rotations, and the like.

Figure 7:
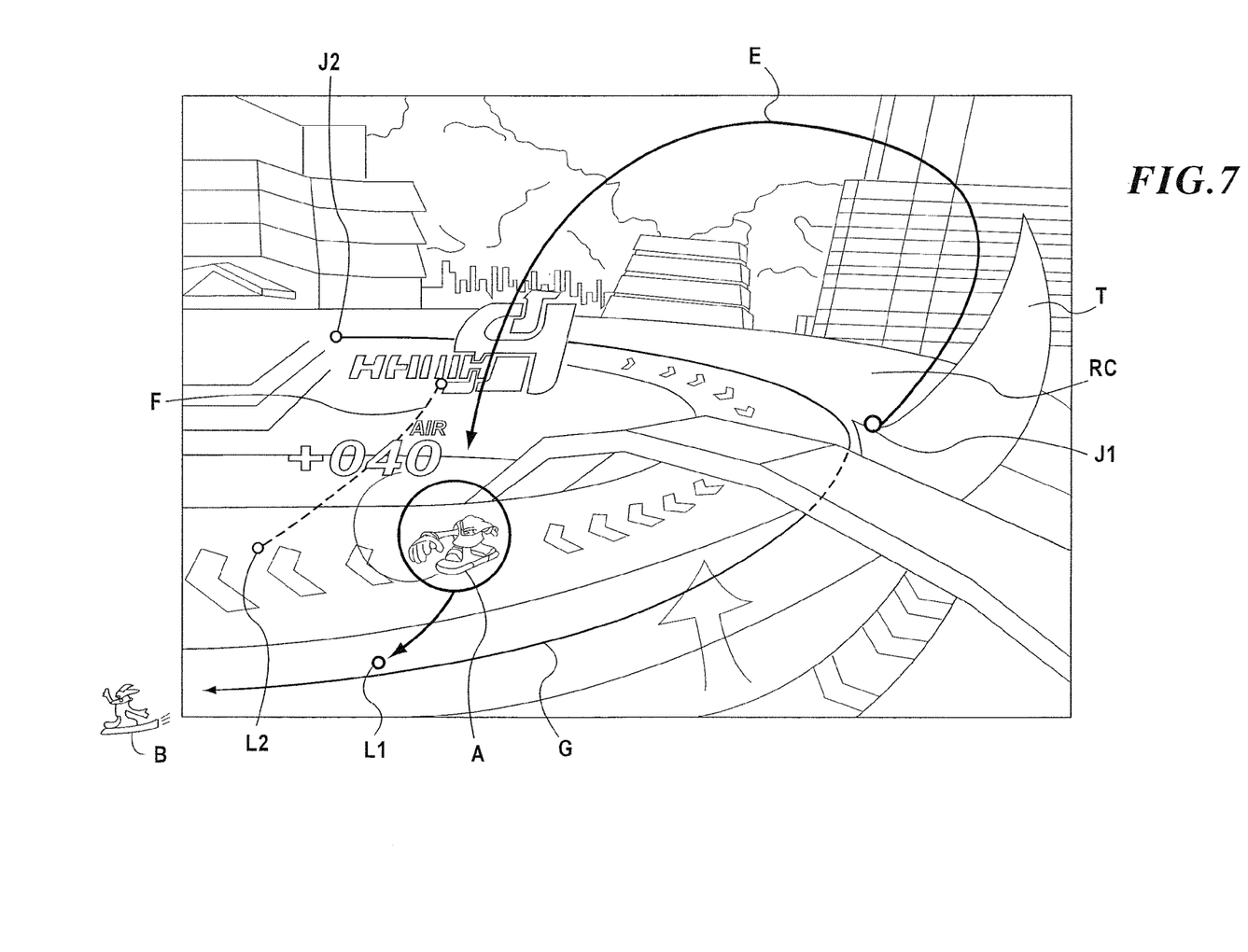
FIG. 7 is a picture for explaining the effects of special action according to another embodiment of the present invention.

FIG. 7 is an image showing the state immediately before the character A operated by the player lands after having performed the trick. The character A moves from around a point J1 in FIG. 7 so as to glide up the wall surface of the turbulence T, then soars up into the sky, and then gives a performance of turns while falling such that its center of gravity follows a parabolic shaped track as indicated with the arrow E in FIG. 7. As shown in a portion of the screen above the character A, this trick is rated as "RANK_A", resulting in the supply of "AIR+040" (liters) of air.

In the present embodiment, the character can be set to utilize the turbulence T to perform a trick, in order to take a shortcut on the prearranged traveling route to go ahead. In other words, in FIG. 7, it is possible to set such that, when the turbulence T occurs around a point J2 in FIG. 7 (but at the time point in FIG. 7 the turbulence has already disappeared around the point J2), the character A starts performing the trick at the point J2, and then lands on a point L2 in FIG. 7. In this trick, the track of the center of gravity of the character A moving in the air is shown as the dashed line F. In this case, the course can be shortcut by a significant longer distance as compared with the path of the character A traveling from the point J2 to the point L2 on the regular course RC without using the trick as indicated by the arrow G.

Figure 8:
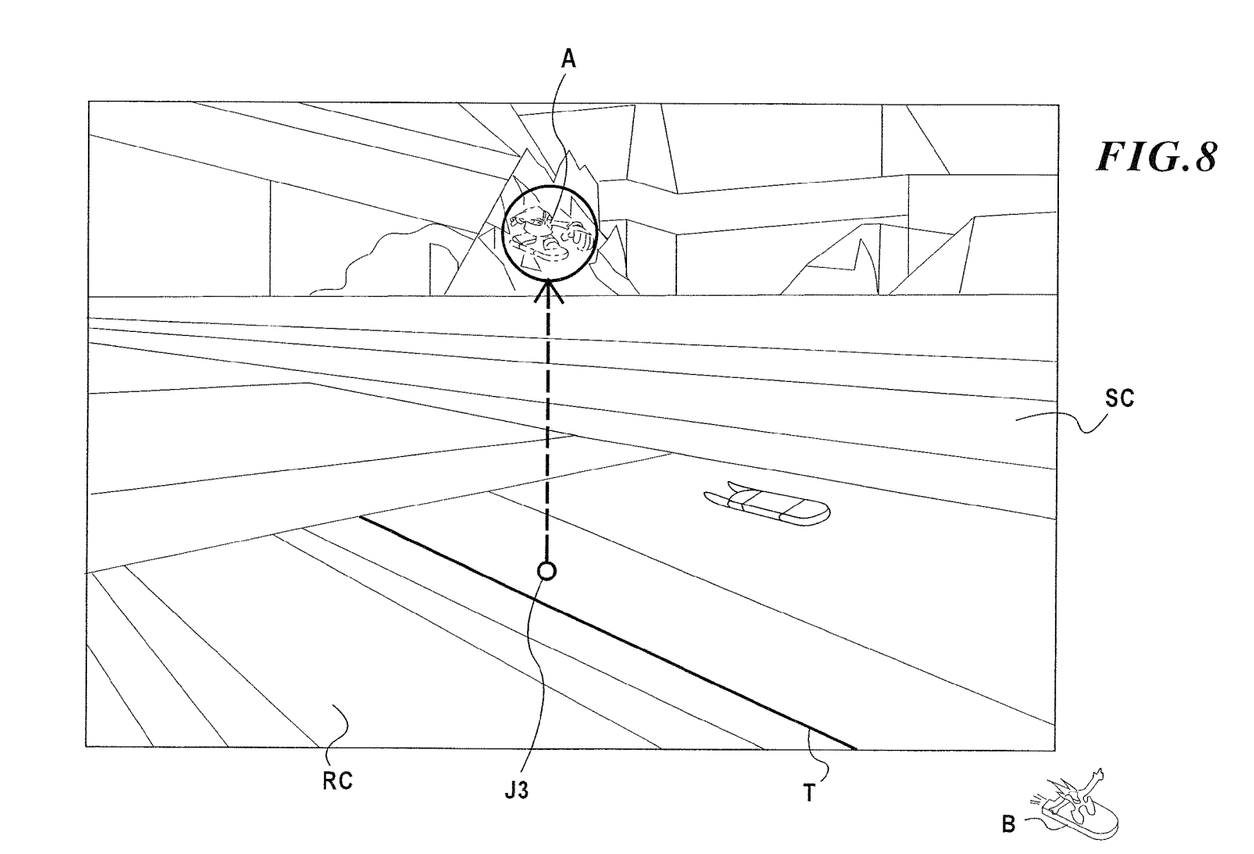
FIG. 8 is a picture for explaining the effects of another special action according to the other embodiment of the present invention.

In the present embodiment, the character can be set to utilize the turbulence T to perform the trick in order to enter a special route which differs from the prearranged traveling route or into which the character cannot go from the prearranged traveling route, for forward travel. This example has been already described with reference to FIG. 6. Another example is described with reference to FIG. 8. In FIG. 8, the character B producing the turbulence T travels from left to right over the regular course RC provided on a lower level, but not appearing on the screen in FIG. 8. The character A operated by the player, which has glided on the turbulence T produced by the character B, glides up the wall surface of the turbulence T from the point J3 in FIG. 8 to use the trick zone above the turbulence T and perform a trick, and goes through the floor of the special route SC provided above the regular course RC and up onto the special route SC.

Since there is less chance of entering such a type of a special route SC, whenever successfully entering the special route, the player can be given privileges of allowing the player to significantly shortcut the regular course RC or using the air supply item, the accelerating item and/or the like provided on the special route SC. On the other hand, it may be set to raise the difficulty level for attack on the game by means of the setting of situation disadvantageous to the player in a predetermined rate in which, for example, the special route SC which the player entered provides a roundabout path significantly longer than the regular course or the character entering the special route is forcibly thrown out of the course and loses its time.

In the present embodiment, when the character glides over the regular course RC, the special route SC may be displayed in a location making it impossible for the character to enter the special route SC. Alternatively, when the character is incapable of entering the special route SC, the special route SC may be set not to be displayed on the screen. Then, when the front character produces turbulence and a trick zone in which the rear character is allowed to perform a trick appears above the turbulence, the special route SC may be set to suddenly appear on the screen in such a manner as to be viewable for the player. Such design makes it possible to greatly interest the player, for example, where and what kind of special route is hidden other than the prearranged course of the player.

In the present embodiment, by riding on the object produced by the front character, the rear character drafting on the turbulence produced by the front character can be set to move within the virtual space at a speed equal to the front character without any air consumption for operating the character as if the rear character is drawn by the front character producing the turbulence. Since this design makes it possible for the rear character drafted on the turbulence to move in the virtual space at a speed equal to that of the front character in such a manner as to be drawn by the front character, with compared as the front character traveling while consuming the action energy, the rear character can follow the front character while preserving the action energy.

In the present embodiment, the rear character drafting on the turbulence produced by the front character is capable of accelerating over the turbulence to pass the moving object in front of this character. The amount of air consumed by this acceleration may be set to become lower or at zero than that when the character is accelerated over the regular course other than on the turbulence, or set to zero. Such design makes it possible for the rear character drafting on the turbulence to further accelerate on the turbulence while moving in the virtual space at the same speed as that of the front character without air consumption. This makes in turn it possible to set the rear character to pass the front character at a speed sufficiently higher than that of the front character, and also set the amount of air consumed by the rear character for accelerating on the turbulence to be less than the amount of air consumed by the rear character for accelerating in the regular virtual space or at zero (it is capable of accelerating without air consumption). As a result, the rear character can pass the front character in a more advantageous state.

Figure 9:
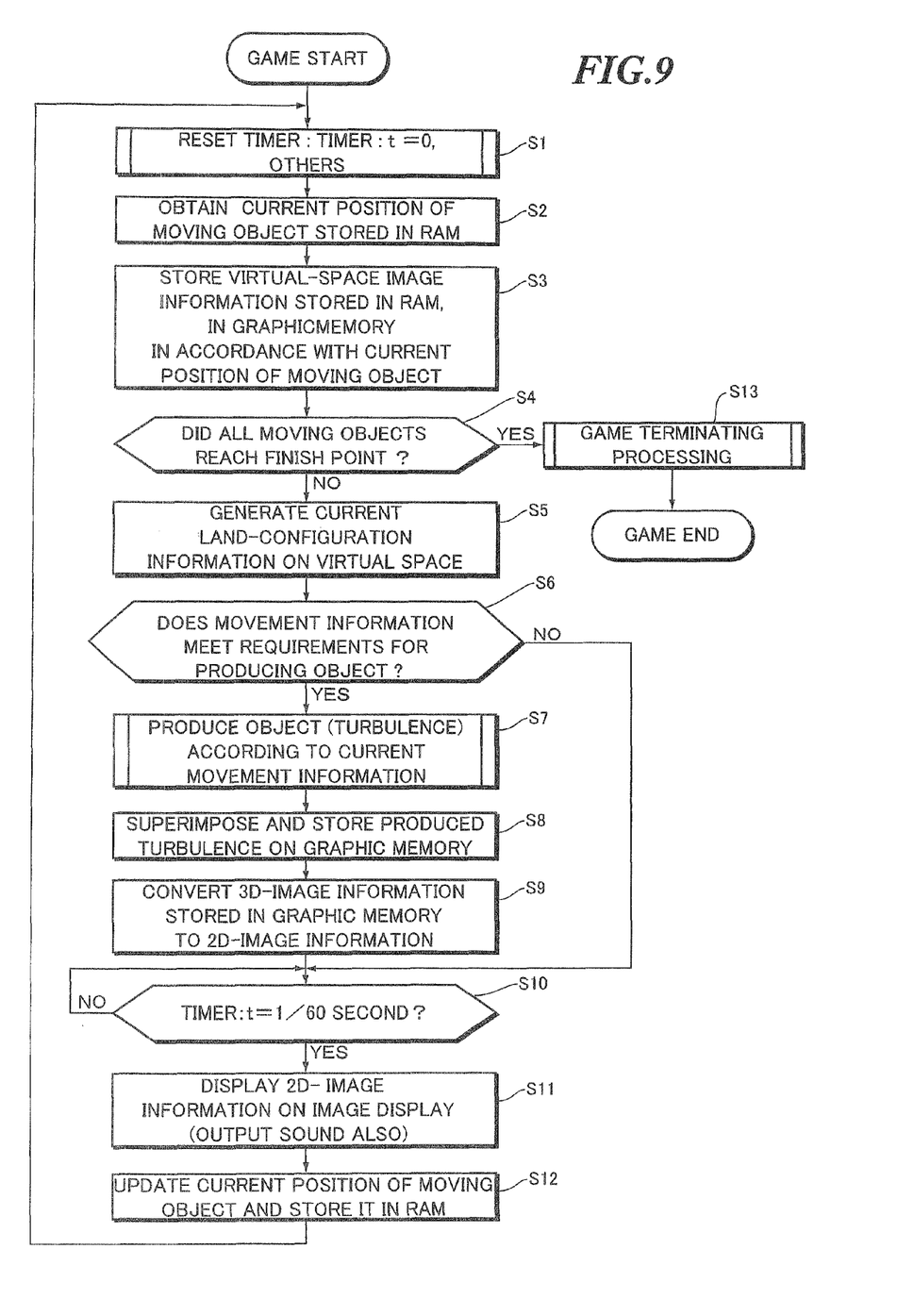
FIG. 9 is a flowchart for describing the operation of a program according to an embodiment of the present invention.

Next, the operation in the present embodiment will be described with reference to FIG. 9 to FIG. 11. FIG. 9 is a flowchart showing an example of the processing in the game apparatus 1 which is the image information generating means in the present embodiment.

The player operates the start button 21 to start the game, whereupon the CPU 110 sets a reset timer to zero at step S1, then goes to step S2. The CPU 110 obtains the coordinates of a current position of a moving object stored in the RAM 130 at step S2, then goes to step S3. At step 3, the CPU 110 retrieves image information about a virtual space stored in the RAM 130 in accordance with the current position of the moving object thus obtained, then stores it in the graphic memory 150, and then goes to step S4. At step S4 the CPU 110 determines whether or not all characters reach the finish point. When determining that all the characters have reached the finish point, the CPU 110 performs the game termination processing at step S13 to terminate the game.

When determining at step S4 that all the characters do not reach the finish point, the CPU 110 goes to step S5 to generate information on the land configuration of the current virtual space such as about background and courses and store it in the RAM 130, and then goes to step S6. The CPU 110 functions as land-configuration information generating means in step S5. At step S6, the CPU 110 determines whether or not the movement information of each character meet the requirements for producing turbulence, the details of which are shown in a subroutine described later. When determining that the requirements are not met, the CPU 110 goes to step S10. When determining at step 6 that the movement information of a certain character meets the requirements for producing the turbulence, the CPU 110 goes to step S7.

At step S57, the CPU 110 performs the processing of instructing the GPU 140 to generate the turbulence according to the current movement information, and then goes to step S8. The CPU 110 and the GPU 140 function at step S7 as special-area object (turbulence) producing means. At step S8 the GPU 140 performs the processing of superimposing and storing three-dimensional image information about the turbulence produced step S7 on the image information in the graphic memory 150, and then the procedure goes to step S9. At step S9, the GPU 140 performs the processing of converting from the three-dimensional image stored in the graphic memory 150 to a two-dimensional image, and then the procedure goes to step S10.

At step S10, the CPU 110 performs the processing of determining whether or not a predetermined time period (e.g. 1/60 second) set on the timer has elapsed. When determining that the predetermined time period has elapsed, the CPU 110 goes to step S11, but when determining that the predetermined time period does not elapse, the CPU 110 repeats the processing in step S10 until the predetermined time period elapses.

At step S11, the CPU 110 performs the processing of sending the two-dimensional image data converted in step S9 to the image display 3 through the image-data output I/F circuit 192 (at this step, the sound data generated by the SPU 160 and stored in sound memory 170 is also supplied to the image display 3 through the sound-data output I/F circuit), and then goes to step S12. The image display 3 visually displays on the screen 31 the input image data on the turbulence.

At step S12, the CPU 110 performs the processing of updating the current position of the character and stores it in the RAM 130, and then returns to step S1. The CPU 110 functions as movement-information monitoring means in step S10 and step S12. The foregoing operation is repeated until the CPU 110 determined at step S4 that all the characters have reached the finish point.

Figure 10:
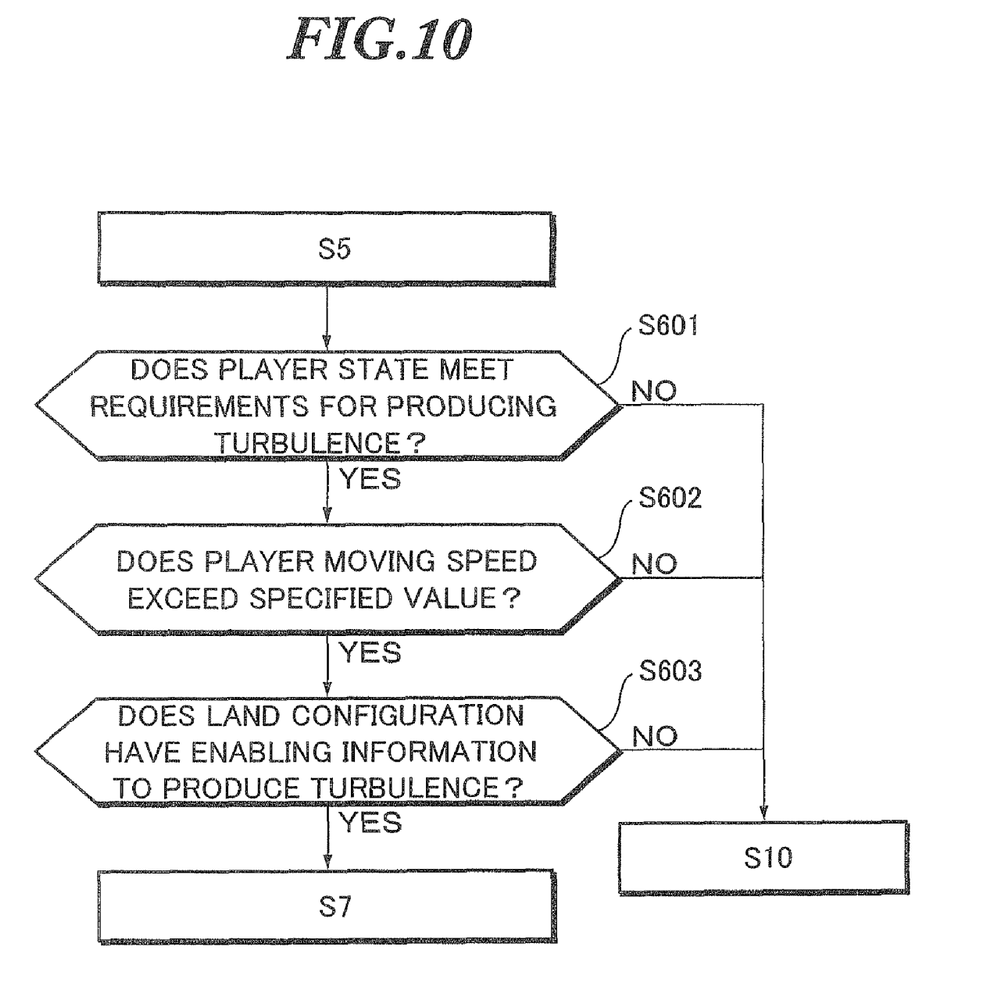
FIG. 10 is a flowchart for describing the operation of some steps as shown in FIG. 9 in detail.

FIG. 10 is a flowchart showing the flow of the processing in step S6 in FIG. 9. The CPU 110 performs at step S601 the processing of determining whether or not the state of the player (character) meets the requirements for producing the turbulence. When the requirements are not met, the CPU 110 goes to step S10. When the requirements are met, the CPU goes to step S602. The state of the character represents a state such as gliding over a regular course, traveling in a curve, being under special action, or the like.

At step S602, the CPU 110 performs the processing of determining whether or not the moving speed of the character exceeds a specified value (e.g., 180 km/h). When determining that it does not exceed, the CPU 110 goes to step S10. When determining that it exceeds, the CPU 110 goes to step S603.

At step S603, the CPU 110 performs the processing of determining whether or not the land-configuration information include any permission information for producing turbulence. When determining that it does not include the permission information, the CPU 110 goes to step S10. When it includes the permission information, the CPU goes to step S7. In this connection, the permission information represents that about whether or not a character is in a place where the character is allowed to exercise the skill, a character is in the no-entry area 65, and the like.

Figure 11:
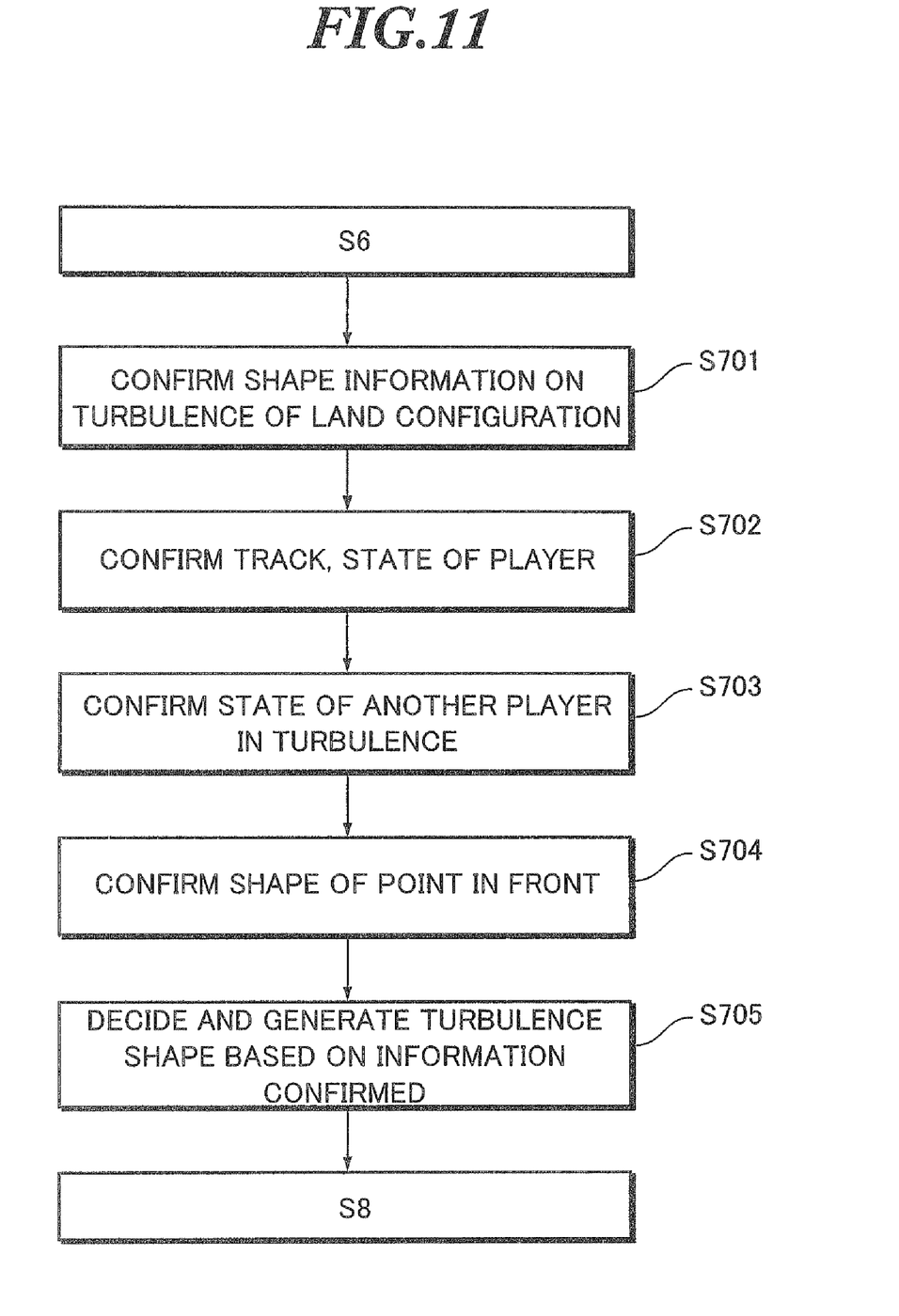
FIG. 11 is a flowchart for describing the operation of another some steps as shown in FIG. 9 in detail.

FIG. 11 is a flowchart showing the flow of the processing in step S7 in FIG. 9. The CPU 110 performs at step S701 the processing of confirming information on turbulence shape which is included in the land configuration stored in the RAM 130, and then goes to step S702. The CPU 110 performs at step S702 the processing of confirming information on movement and track of the player (character) stored in the RAM 130, and then goes to step S703. The CPU 110 performs at step S703 the processing of confirming whether or not another character is drafting on the turbulence produced, and then goes to step S704. The CPU 110 performs at Step S704 the processing of referring the land-configuration information stored in the RAM 130 to confirm points on the land configuration in front of the character, and then goes to step S705. The CPU 110 performs at step S705 the processing of instructing the GPU 130 to generate image data on turbulence on the basis of the information confirmed in each of the steps S701 to S704, and then goes to step S8.

The foregoing has described some embodiments of the present invention. However, the present invention is not limited to the foregoing embodiments. For example, the present invention is also applicable to a game of aiming at the goal while collecting items in the respective points in random order such as in orienteering in which a route is not prearranged.

The present invention is applicable to not only the foregoing virtual racing game but also to racing games such as a horse racing game, a bicycle racing game and a motorboat racing game, or to the other games such as a tag game.

While there has been described what are at present considered to be preferred embodiments of the present invention, it will be understood that various modifications may be made thereto, and it is intended that the appended claims coverall such modifications as fall within the true spirit and scope of the present invention.

What is claimed is:

1. A machine readable recording medium storing a program for a game apparatus, said game apparatus comprising moving-object operating means through which a player operates a moving object, image-information generating means for generating image information on images showing a plurality of moving objects including the moving object operated by the player in a virtual space, and image-information outputting means for outputting the image information generated by the image-information generating means, the stored program causing a computer in the image-information generating means to perform steps of:

causing land-configuration information generating means of said image-information generating means to generate land-configuration information regarding said virtual space;

causing movement-information monitoring means of said image-information generating means to monitor movement information regarding said plurality of moving objects at predetermined time-intervals;

causing special-area object producing means of said image-information generating means to delimit special area behind said moving object to produce a special area object having collision detection information when results of monitoring through the movement-information monitoring means meet predetermined requirements;

causing said image-information outputting means to display said special area object in such a manner as to be viewable for the player; and allowing another moving object to ride in said special area produced by the moving object meeting said predetermined requirements in a manner of riding on waves.

2. The machine readable recording medium according to claim 1, wherein said stored program causes said computer to further perform a step of allowing said moving object producing the special area object by said special-area object producing means to change a movement state to change a shape of said special area object.

3. The machine readable recording medium according to claim 1, wherein said stored program causes said computer to further perform a step of shaping said special area object into a three-dimensional form.

4. The machine readable recording medium according to claim 1, wherein said stored program causes said computer to further perform a step of allowing said another object riding in said special area produced by the moving object meeting said predetermined requirements to perform trick riding through using collision detection information with said special area object.

5. The machine readable recording medium according to claim 4, wherein said stored program causes said computer to further perform a step of allowing said another moving object riding in said special area produced by the moving object meeting said predetermined requirements to take a shortcut on a prearranged traveling route for travel in the forward direction through performing said trick riding.

6. The machine readable recording medium according to claim 4, wherein said stored program causes said computer to further perform a step of allowing said another moving object riding in said special area produced by the moving object meeting said predetermined requirements to enter a special route different from a prearranged traveling route for travel in the forward direction through performing said trick riding.

7. A game apparatus comprising moving-object operating means through which a player operates a moving object, image-information generating means for generating image information on images showing a plurality of moving objects including the moving object operated by the player in a virtual space, and image displaying means for displaying on a screen the image information generated by the image-information generating means, wherein said image-information generating means of said same apparatus comprises:

land-configuration information generating means for generating land-configuration information regarding said virtual space;

movement-information monitoring means for monitoring movement information of said plurality of moving objects at predetermined time-intervals; and special-area object producing means for delimiting a special area behind said moving object to produce an object having collision detection information when results of monitoring through the movement-information monitoring means meet predetermined requirements, wherein said special area object is displayed by said image displaying means in such a manner as to be viewable for the player, and another moving object can ride in said special area produced by the moving object meeting the predetermined requirements in a manner of riding on waves.

8. The game apparatus according to claim 7, wherein said moving object producing said special area object by said special-area object producing means is configured to change a movement state, so that a shape of said special area object can be changed.

9. The game apparatus according to claim 7, wherein said special area object is shaped into a three-dimensional form.

10. The game apparatus according to claim 7, wherein said another moving object riding in said special area produced by the moving object meeting said predetermined requirements is configured to perform trick riding through using collision detection information with said special area object.

11. The game apparatus according to claim 10, wherein said another moving object riding in said special area produced by the moving object meeting said predetermined requirements is configured to take a shortcut on a prearranged route for travel in the forward direction through performing said trick riding.

12. The game apparatus according to claim 10, wherein said another moving object riding in said special area produced by the moving object meeting said predetermined requirements is configured to enter a special route different from a prearranged traveling route for travel in the forward direction through performing said trick riding.

* * * * *